(12) United States Patent
Dubreuil et al.

(10) Patent No.: US 10,927,310 B2
(45) Date of Patent: Feb. 23, 2021

(54) SELECTIVE HYDROGENATION METHOD USING A NICKEL-BASED CATALYST PRODUCED USING AN ADDITIVE COMPRISING A CARBOXYLIC ACID FUNCTION

(71) Applicant: IFP Energies nouvelles, Rueil-Malmaison (FR)

(72) Inventors: Anne-Claire Dubreuil, Lyons (FR); Agathe Martel, Lyons (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 16/473,061

(22) PCT Filed: Dec. 8, 2017

(86) PCT No.: PCT/EP2017/082023
§ 371 (c)(1),
(2) Date: Jun. 24, 2019

(87) PCT Pub. No.: WO2018/114396
PCT Pub. Date: Jun. 28, 2018

(65) Prior Publication Data
US 2019/0330544 A1    Oct. 31, 2019

(30) Foreign Application Priority Data

Dec. 22, 2016 (FR) ..................... 16 63091

(51) Int. Cl.
| | | |
|---|---|---|
| *C10G 45/36* | (2006.01) | |
| *B01J 23/755* | (2006.01) | |
| *B01J 37/02* | (2006.01) | |
| *C10G 45/48* | (2006.01) | |
| *B01J 31/02* | (2006.01) | |
| *B01J 31/04* | (2006.01) | |

(52) U.S. Cl.
CPC ............ *C10G 45/36* (2013.01); *B01J 23/755* (2013.01); *B01J 37/0201* (2013.01); *B01J 37/0203* (2013.01); *B01J 37/0205* (2013.01); *B01J 37/0236* (2013.01); *C10G 45/48* (2013.01); *B01J 31/0201* (2013.01); *B01J 31/0202* (2013.01); *B01J 31/0204* (2013.01); *B01J 31/0208* (2013.01); *B01J 31/0209* (2013.01); *B01J 31/04* (2013.01); *C10G 2300/1055* (2013.01); *C10G 2300/4006* (2013.01); *C10G 2300/4012* (2013.01); *C10G 2300/4018* (2013.01)

(58) Field of Classification Search
None
See application file for complete search history.

(56) References Cited

U.S. PATENT DOCUMENTS

| | | | |
|---|---|---|---|
| 9,328,039 B2 | 5/2016 | Diehl et al. | |
| 2013/0150639 A1* | 6/2013 | Diehl ..................... | B01J 23/755 585/265 |
| 2019/0151834 A1 | 5/2019 | Carrette | |

FOREIGN PATENT DOCUMENTS

| | | |
|---|---|---|
| FR | 2963344 B1 | 7/2012 |
| FR | 2994661 A1 | 2/2014 |
| FR | 2984761 B1 | 12/2014 |
| FR | 3035008 A1 | 10/2016 |

OTHER PUBLICATIONS

International Search Report PCT/EP2017/082023 dated Mar. 19, 2018 (pp. 1-6).

\* cited by examiner

*Primary Examiner* — Tam M Nguyen
(74) *Attorney, Agent, or Firm* — Millen, White, Zelano and Branigan, P.C.

(57) ABSTRACT

A process for the selective hydrogenation of polyunsaturated compounds containing at least 2 carbon atoms per molecule, contained in a hydrocarbon feedstock having a final boiling point below or equal to 300° C. in the presence of a catalyst comprising an alumina support and an active phase comprising nickel, said active phase not comprising a metal from Group VIB, said catalyst being prepared by a process comprising at least:
 i) a step of bringing said support into contact with at least one solution containing at least one nickel precursor;
 ii) a step of bringing said support into contact with at least one solution containing at least one organic compound comprising at least one carboxylic acid function;
 iii) a step of drying said impregnated support at a temperature below 250° C.;
steps i) and ii) being carried out separately, in any order.

19 Claims, No Drawings

SELECTIVE HYDROGENATION METHOD USING A NICKEL-BASED CATALYST PRODUCED USING AN ADDITIVE COMPRISING A CARBOXYLIC ACID FUNCTION

FIELD OF THE INVENTION

The invention relates to a process for the selective hydrogenation of polyunsaturated compounds in a hydrocarbon feedstock, in particular in steam cracking C2-C5 cuts and steam cracking gasolines, in the presence of a nickel-based catalyst supported on an alumina support prepared using an organic additive comprising at least one function of carboxylic acid type.

PRIOR ART

The catalysts for the selective hydrogenation of polyunsaturated compounds are generally based on metals from Group VIII of the Periodic Table of the Elements, such as nickel. The metal is in the form of nanoscale metal particles deposited on a support which may be a refractory oxide. The content of metal from Group VIII, the optional presence of a second metal element, the size of the metal particles and the distribution of the active phase in the support and also the nature and the pore distribution of the support are parameters which may have an influence on the performance of the catalysts.

The rate of the hydrogenation reaction is governed by several criteria, such as the diffusion of the reactants toward the surface of the catalyst (external diffusional limitations), the diffusion of the reactants in the porosity of the support toward the active sites (internal diffusional limitations) and the intrinsic properties of the active phase, such as the size of the metal particles and the distribution of the active phase within the support.

As regards the size of the metal particles, it is generally accepted that the catalyst becomes more active as the size of the metal particles decreases. Furthermore, it is important to obtain a particle size distribution which is centred on the optimum value and also a narrow distribution around this value.

For the purpose of obtaining better catalytic performance, in particular a better selectivity and/or activity, it is known in the prior art to use additives of organic compound type for the preparation of metal catalysts for selective hydrogenation. For example, application FR 2 984 761 discloses a process for the preparation of a selective hydrogenation catalyst comprising a support and an active phase comprising a metal from Group VIII, said catalyst being prepared by a process comprising a step of impregnation with a solution containing a precursor of the metal from Group VIII and an organic additive, more particularly an organic compound having from one to three carboxylic acid functions, a step of drying the impregnated support and a step of calcining the dried support in order to obtain the catalyst.

Patent FR2963344 teaches the use of organic compounds comprising a cyclic oligosaccharide that are composed of at least 6 α-(1,4)-linked glucopyranose subunits.

Within this context, one of the objectives of the present invention is to provide a process for the selective hydrogenation of polyunsaturated compounds such as diolefins and/or acetylenic compounds and/or alkenylaromatic compounds in the presence of a supported catalyst with a nickel active phase, prepared using a particular organic additive that makes it possible to obtain a hydrogenation performance in terms of activity that is at least as good as, or even better than, the processes known from the prior art.

The applicant has discovered that a nickel-based catalyst supported on alumina prepared using an organic additive of carboxylic acid type, of which the impregnation of said additive is carried out in a separate step from the step of impregnation of the nickel, has, when it is used in a selective hydrogenation process, improved catalytic performance, in terms of catalytic activity. This results in a better conversion of the feedstock under identical operating conditions.

SUBJECTS OF THE INVENTION

The present invention relates to a process for the selective hydrogenation of polyunsaturated compounds containing at least 2 carbon atoms per molecule, such as diolefins and/or acetylenic compounds and/or alkenylaromatic compounds, contained in a hydrocarbon feedstock having a final boiling point below or equal to 300° C., which process being carried out at a temperature between 0 and 300° C., at a pressure between 0.1 and 10 MPa, at a hydrogen/(polyunsaturated compounds to be hydrogenated) molar ratio between 0.1 and 10 and at an hourly space velocity of between 0.1 and 200 $h^{-1}$ when the process is carried out in the liquid phase, or at a hydrogen/(polyunsaturated compounds to be hydrogenated) molar ratio between 0.5 and 1000 and at an hourly space velocity of between 100 and 40 000 $h^{-1}$ when the process is carried out in the gas phase in the presence of a catalyst comprising an alumina support and an active phase comprising nickel, said active phase not comprising a metal from Group VIB, said catalyst being prepared by a process comprising at least:
  i) a step of bringing said support into contact with at least one solution containing at least one nickel precursor,
  ii) a step of bringing said support into contact with at least one solution containing at least one organic compound comprising at least one carboxylic acid function;
  iii) a step of drying said impregnated support at a temperature below 250° C.;
  steps i) and ii) being carried out separately, in any order.
According to one embodiment according to the invention, the process may further comprise at least one step iv) of calcining said catalyst obtained in step iii) at a temperature of between 250 and 1000° C.

In one embodiment according to the invention, step i) of the process is carried out before step ii).

In another embodiment according to the invention, step ii) of the process is carried out before step i).

Advantageously, steps i) and/or ii) is (are) carried out by dry impregnation.

Preferably, the content of the element nickel is between 1 and 35% by weight relative to the total weight of the catalyst.

Preferably, said organic compound comprises between 1 and 10 carbon atoms.

In one embodiment according to the invention, said organic compound is chosen from monocarboxylic acids, dicarboxylic acids, tricarboxylic acids or tetracarboxylic acids.

In one embodiment according to the invention, said organic compound comprises at least one carboxylic acid function and further comprises at least one second functional group chosen from ethers, hydroxyls, ketones, esters.

Preferably, when said organic compound comprises at least one carboxylic acid function and at least one ketone function, step ii) is carried out before step i).

Preferably, when said organic compound comprises at least one carboxylic acid function and at least one hydroxyl function, step i) is carried out before step ii).

In one embodiment according to the invention, said organic compound comprises at least three different functional groups chosen from at least one carboxylic acid function, at least one hydroxyl function and at least one ether function or one ketone function.

Preferably, the molar ratio between said organic compound and the nickel is between 0.01 and 5.

In one embodiment according to the invention, the process according to the invention is carried out in the presence of a feedstock chosen from a steam cracking C2 cut or a steam cracking C2-C3 cut, and in which process the hydrogen/(polyunsaturated compounds to be hydrogenated) molar ratio is between 0.5 and 1000, the temperature is between 0 and 300° C., the hourly space velocity (HSV) is between 100 and 40 000 h$^{-1}$, and the pressure is between 0.1 and 6.0 MPa.

In one embodiment according to the invention, the process according to the invention is carried out in the presence of a feedstock chosen from steam cracking gasolines and in which process the hydrogen/(polyunsaturated compounds to be hydrogenated) molar ratio is between 0.5 and 10, the temperature is between 0 and 200° C., the hourly space velocity (HSV) is between 0.5 and 100$^{-1}$, and the pressure is between 0.3 and 8.0 MPa.

DETAILED DESCRIPTION

Definitions

Hereinafter, groups of chemical elements are given according to the CAS classification (CRC Handbook of Chemistry and Physics, published by CRC Press, Editor in Chief D. R. Lide, 81$^{st}$ edition, 2000-2001). For example, Group VIII according to the CAS classification corresponds to the metals of Columns 8, 9 and 10 according to the new IUPAC classification.

Textural and structural properties of the support and of the catalyst described below are determined by the characterization methods known to those skilled in the art. The total pore volume and the pore distribution are determined in the present invention by nitrogen porosimetry as described in the book "Adsorption by powders and porous solids. Principles, methodology and applications", written by F. Rouquérol, J. Rouquérol and K. Sing, Academic Press, 1999.

The specific surface area is understood to mean the BET specific surface area ($S_{BET}$ in m$^2$/g) determined by nitrogen adsorption in accordance with standard ASTM D 3663-78 developed from the Brunauer-Emmett-Teller method described in the journal "*The Journal of American Society*", 1938, 60 (309).

The size of the nickel nanoparticles is understood to mean the mean diameter of the nickel crystallites in oxide form. The mean diameter of the nickel crystallites in oxide form is determined by X-ray diffraction, from the width of the diffraction line located at the angle 2θ=43° (i.e. along the crystallographic direction [200]) using the Scherrer equation. This method, used in X-ray diffraction on polycrystalline samples or powders, which links the full width at half maximum of the diffraction peaks to the size of the particles, is described in detail in the reference: Appl. Cryst. (1978), 11, 102-113, "Scherrer after sixty years: A survey and some new results in the determination of crystallite size", J. I. Langford and A. J. C. Wilson.

Description of the Process

One subject of the present invention is a process for the selective hydrogenation of polyunsaturated compounds containing at least 2 carbon atoms per molecule, such as diolefins and/or acetylenic compounds and/or alkenylaromatic compounds, also referred to as styrenic compounds, contained in a hydrocarbon feedstock having a final boiling point below or equal to 300° C., which process being carried out at a temperature between 0 and 300° C., at a pressure between 0.1 and 10 MPa, at a hydrogen/(polyunsaturated compounds to be hydrogenated) molar ratio between 0.1 and 10 and at an hourly space velocity of between 0.1 and 200 h$^{-1}$ when the process is carried out in the liquid phase, or at a hydrogen/(polyunsaturated compounds to be hydrogenated) molar ratio between 0.5 and 1000 and at an hourly space velocity of between 100 and 40 000 h$^{-1}$ when the process is carried out in the gas phase, in the presence of a catalyst comprising an alumina support and an active phase comprising nickel, said active phase not comprising a metal from Group VIB, said catalyst being prepared by a process comprising at least:

i) a step of bringing said support into contact with at least one solution containing at least one nickel precursor, ii) a step of bringing said support into contact with at least one solution containing at least one organic compound comprising at least one carboxylic acid function;

iii) a step of drying said impregnated support at a temperature below 250° C., so as to obtain a dried catalyst; steps i) and ii) being carried out separately, in any order.

The monounsaturated organic compounds, such as for example ethylene and propylene, are at the root of the manufacture of polymers, plastics and other added-value chemicals. These compounds are obtained from natural gas, naphtha or gasoil which have been treated by steam cracking or catalytic cracking processes. These processes are performed at high temperature and produce, in addition to the desired monounsaturated compounds, polyunsaturated organic compounds such as acetylene, propadiene and methylacetylene (or propyne), 1,2-butadiene and 1,3-butadiene, vinylacetylene and ethylacetylene, and other polyunsaturated compounds, the boiling point of which corresponds to the C5+ cut (hydrocarbon compounds having at least 5 carbon atoms), in particular diolefinic or styrenic or indenic compounds. These polyunsaturated compounds are highly reactive and result in parasitic reactions in the polymerization units. It is therefore necessary to eliminate them before upgrading these cuts.

Selective hydrogenation is the main treatment developed for specifically eliminating the undesirable polyunsaturated compounds from these hydrocarbon feedstocks. It enables the conversion of the polyunsaturated compounds to the corresponding alkenes or aromatics while avoiding the complete saturation thereof and therefore the formation of the corresponding alkanes or naphthenes. In the case of steam cracking gasolines used as feedstock, the selective hydrogenation also makes it possible to selectively hydrogenate the alkenylaromatic compounds to aromatic compounds while avoiding the hydrogenation of the aromatic rings.

Hydrocarbon feedstock treated in the selective hydrogenation process has a final boiling point below or equal to 300° C. and contains at least 2 carbon atoms per molecule and comprises at least one polyunsaturated compound. The expression "polyunsaturated compounds" is understood to mean compounds comprising at least one acetylenic function and/or at least one dienic function and/or at least one alkenylaromatic function.

More particularly, the feedstock is selected from the group consisting of a steam cracking C2 cut, a steam cracking C2-C3 cut, a steam cracking C3 cut, a steam cracking C4 cut, a steam cracking C5 cut and a steam cracking gasoline also referred to as pyrolysis gasoline or C5+ cut.

The steam cracking C2 cut, advantageously used for the implementation of the selective hydrogenation process according to the invention, has for example the following composition: between 40 and 95% by weight of ethylene, of the order of 0.1 to 5% by weight of acetylene, the remainder being essentially ethane and methane. In certain steam cracking C2 cuts, between 0.1 and 1% by weight of C3 compounds may also be present.

The steam cracking C3 cut, advantageously used for the implementation of the selective hydrogenation process according to the invention, has for example the following average composition: of the order of 90% by weight of propylene, of the order of 1 to 8% by weight of propadiene and methylacetylene, the remainder being essentially propane. In certain C3 cuts, between 0.1 and 2% by weight of C2 compounds and C4 compounds may also be present.

A C2-C3 cut may also be advantageously used for the implementation of the selective hydrogenation process according to the invention. It has, for example, the following composition: of the order of 0.1 to 5% by weight of acetylene, of the order of 0.1 to 3% by weight of propadiene and methylacetylene, of the order of 30% by weight of ethylene, of the order of 5% by weight of propylene, the remainder being essentially methane, ethane and propane. This feedstock may also contain between 0.1 and 2% by weight of C4 compounds.

The steam cracking C4 cut, advantageously used for the implementation of the selective hydrogenation process according to the invention, has for example the following average composition by weight: 1% by weight of butane, 46.5% by weight of butene, 51% by weight of butadiene, 1.3% by weight of vinylacetylene and 0.2% by weight of butyne. In certain C4 cuts, between 0.1 and 2% by weight of C3 compounds and of C5 compounds may also be present.

The steam cracking C5 cut, advantageously used for the implementation of the selective hydrogenation process according to the invention, has for example the following composition: 21% by weight of pentanes, 45% by weight of pentenes, 34% by weight of pentadienes.

The steam cracking gasoline or pyrolysis gasoline, advantageously used for the implementation of the selective hydrogenation process according to the invention, corresponds to a hydrocarbon cut having a boiling point generally of between 0 and 300° C., preferably between 10 and 250° C. The polyunsaturated hydrocarbons to be hydrogenated that are present in said steam cracking gasoline are in particular diolefinic compounds (butadiene, isoprene, cyclopentadiene, etc.), styrenic compounds (styrene, alpha-methylstyrene, etc.) and indenic compounds (indene, etc.). The steam cracking gasoline generally comprises the C5-C12 cut with traces of C3, C4, C13, C14, C15 (for example between 0.1 and 3% by weight for each of these cuts). For example, a feedstock formed of pyrolysis gasoline generally has a composition as follows: 5 to 30% by weight of saturated compounds (paraffins and naphthenes), 40 to 80% by weight of aromatic compounds, 5 to 20% by weight of monoolefins, 5 to 40% by weight of diolefins, 1 to 20% by weight of alkenylaromatic compounds, all of the compounds forming 100%. It also contains from 0 to 1000 ppm by weight of sulfur, preferably from 0 to 500 ppm by weight of sulfur.

Preferably, the polyunsaturated hydrocarbon feedstock treated in accordance with the selective hydrogenation process according to the invention is a steam cracking C2 cut, or a steam cracking C2-C3 cut, or a steam cracking gasoline.

The selective hydrogenation process according to the invention aims to eliminate said polyunsaturated hydrocarbons present in said feedstock to be hydrogenated without hydrogenating the monounsaturated hydrocarbons. For example, when said feedstock is a C2 cut, the selective hydrogenation process aims to selectively hydrogenate acetylene. When said feedstock is a C3 cut, the selective hydrogenation process aims to selectively hydrogenate propadiene and methylacetylene. In the case of a C4 cut, the elimination of butadiene, vinylacetylene (VAC) and butyne is targeted, in the case of a C5 cut, the elimination of the pentadienes is targeted. When said feedstock is a steam cracking gasoline, the selective hydrogenation process aims to selectively hydrogenate said polyunsaturated hydrocarbons present in said feedstock to be treated so that the diolefinic compounds are partially hydrogenated to monoolefins and so that the styrenic and indenic compounds are partially hydrogenated to corresponding aromatic compounds while avoiding the hydrogenation of the aromatic rings.

The technological implementation of the selective hydrogenation process is, for example, carried out by upflow or downflow injection of the polyunsaturated hydrocarbon feedstock and of the hydrogen into at least one fixed bed reactor. Said reactor may be of isothermal type or of adiabatic type. An adiabatic reactor is preferred. The polyunsaturated hydrocarbon feedstock may advantageously be diluted by one or more reinjection(s) of the effluent, resulting from said reactor where the selective hydrogenation reaction takes place, at various points of the reactor, located between the inlet and the outlet of the reactor, in order to limit the temperature gradient in the reactor. The technological implementation of the selective hydrogenation process according to the invention may also advantageously be carried out by the implantation of at least said supported catalyst in a reactive distillation column or in reactors-exchangers or in a slurry-type reactor. The stream of hydrogen may be introduced at the same time as the feedstock to be hydrogenated and/or at one or more different points of the reactor.

The selective hydrogenation of the steam cracking C2, C2-C3, C3, C4, C5 and C5+ cuts may be carried out in the gas phase or in the liquid phase, preferably in the liquid phase for the C3, C4, C5 and C5+ cuts and in the gas phase for the C2 and C2-C3 cuts. A reaction in the liquid phase makes it possible to lower the energy cost and increase the cycle time of the catalyst.

Generally, the selective hydrogenation of a hydrocarbon feedstock containing polyunsaturated compounds containing at least 2 carbon atoms per molecule and having a final boiling point below or equal to 300° C. is carried out at a temperature between 0 and 300° C., at a pressure between 0.1 and 10 MPa, at a hydrogen/(polyunsaturated compounds to be hydrogenated) molar ratio between 0.1 and 10 and at an hourly space velocity HSV (defined as the ratio of the volume flow rate of feedstock to the volume of the catalyst) of between 0.1 and 200 $h^{-1}$ for a process carried out in the liquid phase, or at a hydrogen/(polyunsaturated compounds to be hydrogenated) molar ratio of between 0.5 and 1000 and at an hourly space velocity HSV of between 100 and 40 000 $h^{-1}$ for a process carried out in the gas phase.

In one embodiment according to the invention, when a selective hydrogenation process is carried out in which the feedstock is a steam cracking gasoline comprising polyunsaturated compounds, the (hydrogen)/(polyunsaturated compounds to be hydrogenated) molar ratio is generally between 0.5 and 10, preferably between 0.7 and 5.0 and more preferably still between 1.0 and 2.0, the temperature is between 0 and 200° C., preferably between 20 and 200° C. and more preferably still between 30 and 180° C., the hourly space velocity (HSV) is generally between 0.5 and 100 $h^{-1}$, preferably between 1 and 50 $h^{-1}$, and the pressure is generally between 0.3 and 8.0 MPa, preferably between 1.0 and 7.0 MPa and more preferably still between 1.5 and 4.0 MPa.

More preferably, a selective hydrogenation process is carried out in which the feedstock is a steam cracking gasoline comprising polyunsaturated compounds, the hydrogen/(polyunsaturated compounds to be hydrogenated) molar ratio is between 0.7 and 5.0, the temperature is between 20 and 200° C., the hourly space velocity (HSV) is generally between 1 and 50 $h^{-1}$ and the pressure is between 1.0 and 7.0 MPa.

More preferably still, a selective hydrogenation process is carried out in which the feedstock is a steam cracking gasoline comprising polyunsaturated compounds, the hydrogen/(polyunsaturated compounds to be hydrogenated) molar ratio is between 1.0 and 2.0, the temperature is between 30 and 180° C., the hourly space velocity (HSV) is generally between 1 and 50 $h^{-1}$ and the pressure is between 1.5 and 4.0 MPa.

The hydrogen flow rate is adjusted in order to have available a sufficient amount thereof to theoretically hydrogenate all of the polyunsaturated compounds and to maintain an excess of hydrogen at the reactor outlet.

In another embodiment according to the invention, when a selective hydrogenation process is carried out in which the feedstock is a steam cracking C2 cut and/or a steam cracking C2-C3 cut comprising polyunsaturated compounds, the (hydrogen)/(polyunsaturated compounds to be hydrogenated) molar ratio is generally between 0.5 and 1000, preferably between 0.7 and 800, the temperature is between 0 et 300° C., preferably between 15 and 280° C., the hourly space velocity (HSV) is generally between 100 and 40 000 $h^{-1}$, preferably between 500 and 30 000 $h^{-1}$, and the pressure is generally between 0.1 and 6.0 MPa, preferably between 0.2 and 5.0 MPa.

Description of the Catalyst

The catalyst used for the implementation of the selective hydrogenation process according to the invention comprises an active phase deposited on a support comprising alumina, said active phase comprising nickel. Said active phase is free of metals belonging to Group VIB (Cr, Mo, W) of the Periodic Table of the Elements. More particularly, the active phase does not comprise molybdenum or tungsten. More preferentially still, the active phase consists of nickel. According to the invention, the content of element nickel in the catalyst is between 1% and 35% by weight of the mass of catalyst, preferably between 5 and 30% by weight, more preferentially between 8 and 25% by weight, and more preferentially still between 12% and 23% by weight. The Ni content is measured by X-ray fluorescence.

The nickel is in the form of nanoparticles deposited on said support. The size of the nickel nanoparticles in the catalyst, measured in their oxide form, is less than or equal to 18 nm, preferably less than or equal to 15 nm, more preferentially between 0.5 and 12 nm, and even more preferentially between 1.5 and 8.0 nm, more preferably between 3 and 8 nm, more preferentially between 4 and 7 nm and even more preferably between 4 and 6 nm.

The active phase of said catalyst also advantageously comprises at least one additional metal chosen from the metals from Group VIII, the metals from Group IB and/or tin. Preferably, the additional metal from Group VIII is chosen from palladium, platinum, ruthenium, rhodium and iridium. Preferably, the additional metal from Group IB is chosen from copper, gold and silver. Said additional metal(s) is (are) preferentially present with a content representing from 0.01% to 20% by weight of the mass of the catalyst, preferably from 0.05% to 10% by weight of the mass of the catalyst and more preferably still from 0.05% to 5% by weight of the mass of said catalyst. The tin is preferentially present at a content representing from 0.02% to 15% by weight of the mass of the catalyst, so that the Sn/Ni molar ratio is between 0.01 and 0.2, preferably between 0.025 to 0.055, and more preferably still between 0.03 to 0.05.

Said catalyst according to the invention is generally present in all forms known to those skilled in the art, for example in the form of beads, extrudates, tablets, pellets, hollow cylinders or irregular and nonspherical agglomerates, the specific shape of which may result from a crushing step.

In one particular embodiment according to the invention, the catalyst consists of extrudates having a diameter generally of between 0.5 and 10 mm, preferably between 0.8 and 3.2 mm and very preferably between 1.0 and 2.5 mm. This catalyst may advantageously be presented in the form of cylindrical, multilobal, trilobal or quadrilobal extrudates. Preferably, its shape will be trilobal or quadrilobal. The shape of the lobes could be adjusted according to all the methods known from the prior art.

In another particular embodiment according to the invention, the catalyst is in the form of beads having a diameter of between 1 and 8 mm, preferably between 2 and 7 mm.

The support on which said active phase is deposited comprises alumina ($Al_2O_3$).

In a first embodiment variant, the alumina present in said support is a transition alumina, such as a $\gamma$-, $\delta$-, $\theta$-, $\chi$-, $\rho$-, $\eta$- or $\kappa$-alumina, alone or as a mixture. More preferably, the alumina is a $\gamma$, $\delta$ or $\theta$ transition alumina, alone or as a mixture.

In a second embodiment variant, the alumina present in said support is an $\alpha$-alumina.

The support may comprise another oxide different from alumina, such as silica ($SiO_2$), titanium dioxide ($TiO_2$), ceria ($CeO_2$) and zirconia ($ZrO_2$). The support may be a silica-alumina. Very preferably, said support consists solely of alumina.

The pore volume of the support is generally between 0.1 $cm^3/g$ and 1.5 $cm^3/g$, preferably between 0.5 $cm^3/g$ and 1.0 $cm^3/g$. The specific surface area of the support is generally greater than or equal to 5 $m^2/g$, preferably greater than or equal to 30 $m^2/g$, more preferentially between 40 $m^2/g$ and 250 $m^2/g$, and more preferentially still between 50 $m^2/g$ and 200 $m^2/g$.

Description of the Catalyst Preparation Process

Generally, the catalyst used within the context of the selective hydrogenation process is prepared by a process comprising at least the following steps:
  i) a step of bringing said support into contact with at least one solution containing at least one nickel precursor;
  ii) a step of bringing said support into contact with at least one solution containing at least one organic compound comprising at least one carboxylic acid function;
  iii) a step of drying said impregnated support at a temperature below 250° C., so as to obtain a dried catalyst;
  steps i) and ii) being carried out separately, in any order.

Step i) Bringing the Nickel Precursor into Contact with the Support

The deposition of the nickel on said support, in accordance with the implementation of said step i), may be carried out by any method well known to those skilled in the art. In particular, said step i) may be carried out by dry impregnation, by excess impregnation, or else by deposition-precipitation according to methods well known to those skilled in the art.

Said step i) is preferably carried out by impregnation of the support consisting, for example, in bringing said support into contact with at least one solution, which is aqueous or organic (for example methanol or ethanol or phenol or acetone or toluene or dimethyl sulfoxide (DMSO)) or else consists of a mixture of water and of at least one organic solvent, containing at least one nickel precursor at least partially in the dissolved state, or else in bringing said support into contact with at least one colloidal solution of at least one precursor of the nickel, in the oxidized form (nanoparticles of oxide, of oxy(hydroxide) or of hydroxide of the nickel) or in the reduced form (metal nanoparticles of the nickel in the reduced state). Preferably, the solution is aqueous. The pH of this solution could be modified by the optional addition of an acid or of a base. According to another preferred alternative form, the aqueous solution may contain ammonia or ammonium $NH_4^+$ ions.

Preferably, said step i) is carried out by dry impregnation, which consists in bringing the catalyst support into contact with a solution containing at least one nickel precursor, of which the volume of the solution is between 0.25 and 1.5 times the pore volume of the support to be impregnated.

When the nickel precursor is introduced in aqueous solution, use is advantageously made of a nickel precursor in the nitrate, carbonate, chloride, sulfate, hydroxide, hydroxycarbonate, formate, acetate or oxalate form, in the form of complexes formed with acetylacetonates, or else in the form of tetrammine or hexammine complexes, or in the form of any other inorganic derivative which is soluble in aqueous solution, which is brought into contact with said support. Use is advantageously made, as nickel precursor, of nickel nitrate, nickel carbonate, nickel chloride, nickel hydroxide or nickel hydroxycarbonate. Very preferably, the nickel precursor is nickel nitrate, nickel carbonate or nickel hydroxide.

The amounts of the nickel precursor(s) introduced into the solution are chosen so that the total content of element nickel is between 1% and 35% by weight of the mass of catalyst, preferably between 5% and 30% by weight, more preferentially between 8% and 25% by weight, and more preferentially still between 12% and 23% by weight.

In the embodiment in which step i) is carried out by dry impregnation or excess impregnation, preferably dry impregnation, the impregnation of the nickel with the support may advantageously be carried out via at least two impregnation cycles, using identical or different nickel precursors in each cycle. In this case, each impregnation is advantageously followed by drying and optionally a heat treatment.

Any other additional element may be introduced either at the time of the step of bringing the nickel into contact with the support or in another step different from bringing said additional element into contact with the support. When it is desired to introduce an additional metal chosen from the metals from Group VIII, the metals from Group IB and/or tin, use is advantageously made, as precursor, of a salt chosen from the nitrate, sulfate or chloride, or any other conventional precursor. When any other additional element is introduced in a step different from bringing said additional element into contact with the support, said step may be followed by drying and optionally a heat treatment.

Step ii) Bringing the Organic Compound Into Contact With the Support

Said support may be brought into contact with at least one solution containing at least one organic compound comprising at least one carboxylic acid function, in accordance with the implementation of said step ii), by any method well known to those skilled in the art. In particular, said step ii) may be carried out by dry impregnation or by excess impregnation according to methods well known to those skilled in the art. Preferably, said step ii) is carried out by dry impregnation, which consists in bringing the catalyst support into contact with a volume of said solution of between 0.25 and 1.5 times the pore volume of the support to be impregnated.

Said solution containing at least one organic compound comprising at least one carboxylic acid function may be aqueous or organic (for example methanol or ethanol or phenol or acetone or toluene or dimethyl sulfoxide (DMSO)) or else consist of a mixture of water and of at least one organic solvent. Said organic compound is, beforehand, at least partially dissolved in said solution at the desired concentration. Preferably, said solution is aqueous or contains ethanol. More preferably still, said solution is aqueous. The pH of said solution could be modified by the optional addition of an acid or of a base. In another possible embodiment, the solvent may be absent from the impregnation solution.

In the embodiment in which step ii) is carried out by dry impregnation or excess impregnation, preferably dry impregnation, the impregnation of the support may be carried out by using one or more solutions, of which one at least of said solutions comprises at least one organic compound comprising at least one carboxylic acid function.

In the embodiment in which step ii) is carried out by dry impregnation or excess impregnation, preferably dry impregnation, the impregnation of the support may advantageously be carried out via at least two impregnation cycles, using organic compounds, or mixtures of organic compounds, of which one at least comprises at least one carboxylic acid function, which are identical or different in each cycle. In this case, each impregnation is advantageously followed by drying and optionally a heat treatment.

Said organic compound comprising at least one carboxylic acid function may be a saturated or unsaturated aliphatic organic compound, or an aromatic organic compound.

Preferably, said organic compound comprises between 1 and 10 carbon atoms.

Preferably, when said organic compound is a saturated or unsaturated aliphatic organic compound, said compound comprises between 1 and 9 carbon atoms, preferably between 2 and 7 carbon atoms.

Preferably, when said organic compound is an aromatic organic compound, said compound comprises between 7 and 10 carbon atoms, preferably between 7 and 9 carbon atoms.

The molar ratio of said organic compound comprising at least one carboxylic acid function introduced during step ii) relative to the element nickel introduced in step i) is between 0.01 and 5.0 mol/mol, preferably between 0.05 and 2.0 mol/mol, more preferentially between 0.1 and 1.5 mol/mol and more preferentially still between 0.3 and 1.2 mol/mol.

Said saturated or unsaturated aliphatic organic compound or said aromatic organic compound comprising at least one carboxylic acid function may be chosen from monocarboxylic acids, dicarboxylic acids, tricarboxylic acids or tetracarboxylic acids.

In a specific embodiment of the invention, said organic compound is a saturated aliphatic monocarboxylic acid, the aliphatic chain being linear or branched or cyclic. When the organic compound is a saturated linear monocarboxylic acid, it is preferably chosen from formic acid, acetic acid, propionic acid, butanoic acid, valeric acid, hexanoic acid, heptanoic acid, octanoic acid or nonanoic acid. Preferably, said organic compound is chosen from formic acid, acetic acid or propionic acid. More preferentially, said organic compound is formic acid. When the organic compound is a saturated branched monocarboxylic acid, it is preferably chosen from isobutyric acid, pivalic acid, 4-methyloctanoic acid, 3-methylvaleric acid, 4-methylvaleric acid, 2-methylvaleric acid, isovaleric acid, 2-ethylhexanoic acid, 2-methylbutyric acid, 2-ethylbutyric acid, 2-propylvalerianic acid or valproic acid, in any one of the isomeric forms thereof. When the organic compound is a saturated cyclic monocarboxylic acid, it is preferably chosen from cyclopentanecarboxylic acid or cyclohexanecarboxylic acid.

In a specific embodiment of the invention, said organic compound is an unsaturated aliphatic monocarboxylic acid, the aliphatic chain being linear or branched or cyclic, preferably chosen from methacrylic acid, acrylic acid, vinylacetic acid, crotonic acid, isocrotonic acid, penten-2-oic acid, penten-3-oic acid, penten-4-oic acid, tiglic acid, angelic acid, sorbic acid or acetylenecarboxylic acid, in any one of the isomeric forms thereof.

In a specific embodiment of the invention, said organic compound is an aromatic monocarboxylic acid preferably chosen from benzoic acid, methylbenzoic acid, dimethylbenzoic acid, trimethylbenzoic acid, ethylbenzoic acid, o-tolylacetic acid, phenylacetic acid, 2-phenylpropionic acid, 3-phenylpropionic acid, 4-vinylbenzoic acid, phenylacetylenecarboxylic acid or cinnamic acid, in any one of the isomeric forms thereof.

In a specific embodiment of the invention, said organic compound is a saturated or unsaturated aliphatic dicarboxylic acid, the aliphatic chain being linear or branched or cyclic.

When the organic compound is a saturated linear dicarboxylic acid, it is preferably chosen from ethanedioic acid (oxalic acid), propanedioic acid (malonic acid), butanedioic acid (succinic acid), pentanedioic acid (glutaric acid), hexanedioic acid (adipic acid), heptanedioic acid (pimelic acid), octanedioic acid (suberic acid) or nonanedioic acid (azelaic acid). When the organic compound is a saturated branched dicarboxylic acid, it is preferably chosen from 2-methylglutaric acid, 3-methylglutaric acid, 3,3-dimethylglutaric acid, 2,2-dimethylglutaric acid or butane-1,2-dicarboxylic acid, in any one of the isomeric forms thereof.

Preferably, said organic compound is chosen from ethanedioic acid (oxalic acid), propanedioic acid (malonic acid), butanedioic acid (succinic acid) or pentanedioic acid (glutaric acid), in any one of the isomeric forms thereof.

When the organic compound is a saturated cyclic dicarboxylic acid, it is preferably chosen from cyclohexanedicarboxylic acid or pinic acid, in any one of the isomeric forms thereof.

More preferably still, said organic compound is chosen from 1,2-cyclohexanedicarboxylic acid or 1,3-cyclohexanedicarboxylic acid, in any one of the isomeric forms thereof.

When the organic compound is an unsaturated, linear or branched or cyclic, dicarboxylic acid, it is preferably chosen from (Z)-butenedioic acid (maleic acid), (E)-butenedioic acid (fumaric acid), pent-2-enedioic acid (glutaconic acid), (2E,4E)-hexa-2,4-dienedioic acid (muconic acid), mesaconic acid, citraconic acid, acetylenedicarboxylic acid, 2-methylenesuccinic acid (itaconic acid) or hexa-2,4-dienedioic acid, in any one of the isomeric forms thereof.

Preferably, said organic compound is chosen from (Z)-butenedioic acid (maleic acid), (E)-butenedioic acid (fumaric acid), pent-2-enedioic acid (glutaconic acid), mesaconic acid, citraconic acid or 2-methylenesuccinic acid (itaconic acid), in any one of the isomeric forms thereof. More preferably still, said organic compound is chosen from (Z)-butenedioic acid (maleic acid), (E)-butenedioic acid (fumaric acid) or pent-2-enedioic acid (glutaconic acid).

In a specific embodiment of the invention, said organic compound is an aromatic dicarboxylic acid preferably chosen from benzene-1,2-dicarboxylic acid (phthalic acid), benzene-1,3-dicarboxylic acid (isophthalic acid), benzene-1,4-dicarboxylic acid (terephthalic acid) or phenylsuccinic acid, in any one of the isomeric forms thereof. Preferably, said organic compound is benzene-1,2-dicarboxylic acid (phthalic acid).

In a specific embodiment of the invention, said organic compound is a saturated or unsaturated aliphatic or aromatic tricarboxylic acid preferably chosen from 1,2,3-propanetricarboxylic acid (tricarballylic acid), 1,2,4-butanetricarboxylic acid, 1,2,3-propenetricarboxylic acid (aconitic acid), 1,3,5-benzenetricarboxylic acid (trimesic acid) or 1,2,4-benzenetricarboxylic acid, in any one of the isomeric forms thereof. Preferably, said organic compound is chosen from 1,2,3-propanetricarboxylic acid (tricarballylic acid), 1,2,4-butanetricarboxylic acid, 1,2,3-propenetricarboxylic acid (aconitic acid) or 1,2,4-benzenetricarboxylic acid, in any one of the isomeric forms thereof.

In a specific embodiment of the invention, said organic compound is a saturated or unsaturated aliphatic or aromatic tetracarboxylic acid preferably chosen from methanetetracarboxylic acid, 1,2,3,4-butanetetracarboxylic acid, ethylenetetracarboxylic acid or 1,2,4,5-benzenetetracarboxylic acid, in any one of the isomeric forms thereof. Preferably, said organic compound is chosen from 1,2,3,4-butanetetracarboxylic acid or 1,2,4,5-benzenetetracarboxylic acid, in any one of the isomeric forms thereof.

In another embodiment according to the invention, said organic compound may comprise at least one second functional group chosen from ethers, hydroxyls, ketones or esters. Advantageously, said organic compound comprises at least one carboxylic acid function and at least one hydroxyl function, or at least one carboxylic acid function and at least one ether function, or at least one carboxylic acid function and at least one ketone function. Advantageously, said organic compound may comprise at least three different functional groups chosen from at least one carboxylic acid function, at least one hydroxyl function and at least one functional group other than the carboxylic acid and hydroxyl functions, such as an ether function or a ketone function.

Mention may be made, among organic compounds comprising at least one carboxylic acid function and at least one hydroxyl function, of hydroxy acids of monocarboxylic acids, hydroxy acids of dicarboxylic acids or of polycarboxylic acids, dihydroxy acids of monocarboxylic acids or of polycarboxylic acids, trihydroxy acids of monocarboxylic acids or of polycarboxylic acids, and more generally polyhydroxy acids of monocarboxylic acids or of polycarboxylic acids, it being possible for the carbon chain of said acids to be saturated (linear, branched or cyclic) aliphatic or unsaturated (linear, branched or cyclic) aliphatic or to contain at least one aromatic ring. Preferably, said organic compound is chosen from hydroxy acids or dihydroxy acids of monocarboxylic acids or of dicarboxylic acids or of tricarboxylic acids.

When the organic compound is a hydroxy acid of a monocarboxylic acid, it is preferably chosen from hydroxyacetic acid (glycolic acid), 2-hydroxypropanoic acid (lactic acid), 2-hydroxyisobutyric acid or the other α-hydroxy acids, 3-hydroxypropanoic acid, 3-hydroxybutyric acid, 3-hydroxypentanoic acid, 3-hydroxyisobutyric acid, 3-hydroxy-3-methylbutanoic acid or the other β-hydroxy acids, 4-hydroxybutyric acid or the other γ-hydroxy acids, mandelic acid, 3-phenyllactic acid, tropic acid, hydroxybenzoic acid, salicylic acid, (2-hydroxyphenyl)acetic acid, (3-hydroxyphenyl)acetic acid, (4-hydroxyphenyl)acetic acid or coumaric acid, in any one of the isomeric forms thereof. Preferably, said organic compound is chosen from hydroxyacetic acid (glycolic acid), 2-hydroxypropanoic acid (lactic acid), 3-hydroxypropanoic acid, 3-hydroxybutyric acid, 3-hydroxyisobutyric acid, mandelic acid, 3-phenyllactic acid, tropic acid or salicylic acid, in any one of the isomeric forms thereof. More preferably still, said organic compound is chosen from hydroxyacetic acid (glycolic acid), 2-hydroxypropanoic acid (lactic acid), 3-hydroxypropanoic acid, 3-hydroxybutyric acid or 3-hydroxyisobutyric acid.

When the organic compound is hydroxy acid of a polycarboxylic acid, it is preferably chosen from 2-hydroxypropanedioic acid (tartronic acid), 2-hydroxybutanedioic acid (malic acid), acetolactic acid or the other α-hydroxy acids or ⊖-hydroxy acids or γ-hydroxy acids of dicarboxylic acids, 5-hydroxyisophthalic acid, 2-hydroxypropane-1,2,3-tricarboxylic acid (citric acid), isocitric acid, homocitric acid, homoisocitric acid or the other α-hydroxy acids or β-hydroxy acids or γ-hydroxy acids of tricarboxylic acids, in any one of the isomeric forms thereof. Preferably, said organic compound is chosen from 2-hydroxypropanedioic acid (tartronic acid), 2-hydroxybutanedioic acid (malic acid), acetolactic acid, 2-hydroxypropane-1,2,3-tricarboxylic acid (citric acid), isocitric acid, homocitric acid or homoisocitric acid, in any one of the isomeric forms thereof. More preferably still, said organic compound is chosen from 2-hydroxypropanedioic acid (tartronic acid), 2-hydroxybutanedioic acid (malic acid), acetolactic acid or 2-hydroxypropane-1,2,3-tricarboxylic acid (citric acid).

When the organic compound is a dihydroxy acid of a monocarboxylic acid, it is preferably chosen from glyceric acid, 2,3-dihydroxy-3-methylpentanoic acid, pantoic acid or the other α,α-dihydroxy acids or α,β-dihydroxy acids or α,γ-dihydroxy acids, 3,5-dihydroxy-3-methylpentanoic acid (mevalonic acid) or the other β,β-dihydroxy acids or β,γ-dihydroxy acids or γ,γ-dihydroxy acids, bis(hydroxymethyl)-2,2-propionic acid, 2,3-dihydroxybenzoic acid, α-resorcylic acid, β-resorcylic acid, γ-resorcylic acid, gentisic acid, protocatechuic acid, orsellinic acid, homogentisic acid or caffeic acid, in any one of their isomeric forms. Preferably, said organic compound is chosen from glyceric acid, 2,3-dihydroxy-3-methylpentanoic acid, pantoic acid, 2,3-dihydroxybenzoic acid, β-resorcylic acid, γ-resorcylic acid, gentisic acid or orsellinic acid, in any one of the isomeric forms thereof. More preferably still, said organic compound is chosen from glyceric acid, 2,3-dihydroxy-3-methylpentanoic acid or pantoic acid.

When the organic compound is a dihydroxy acid of a polycarboxylic acid, it is preferably chosen from dihydroxymalonic acid, 2,3-dihydroxybutanedioic acid (tartaric acid) or the other α,α-dihydroxy acids or α,β-dihydroxy acids or α,γ-dihydroxy acids or β,β-dihydroxy acids or β,γ-dihydroxy acids or γ,γ-dihydroxy acids of dicarboxylic acids, or hydroxycitric acid, in any one of the isomeric forms thereof. Preferably, said organic compound is chosen from dihydroxymalonic acid, 2,3-dihydroxybutanedioic acid (tartaric acid) or hydroxycitric acid, in any one of the isomeric forms thereof. More preferably still, said organic compound is chosen from dihydroxymalonic acid or 2,3-dihydroxybutanedioic acid (tartaric acid).

When the organic compound is a polyhydroxy acid of a monocarboxylic acid or of a polycarboxylic acid, it is preferably chosen from shikimic acid, trihydroxybenzoic acid, gallic acid, phloroglucinic acid, pyrogallolcarboxylic acid, quinic acid, gluconic acid, mucic acid or saccharic acid, in any one of the isomeric forms thereof. Preferably, said organic compound is chosen from trihydroxybenzoic acid, quinic acid, gluconic acid, mucic acid or saccharic acid, in any one of the isomeric forms thereof. More preferably still, said organic compound is chosen from quinic acid, gluconic acid, mucic acid or saccharic acid.

Mention may be made, among the organic compounds comprising at least one carboxylic acid function and at least one ether function, of 2-methoxyacetic acid, 2,2'-oxydiacetic acid (diglycolic acid), 4-methoxybenzoic acid, 4-isopropoxybenzoic acid, 3-methoxyphenylacetic acid, 3-methoxycinnamic acid, 4-methoxycinnamic acid, 3,4-dimethoxycinnamic acid, veratric acid, tetrahydrofuran-2-carboxylic acid, furan-3-carboxylic acid or 2,5-dihydrofuran-3,4-dicarboxylic acid, according to any one of the isomeric forms thereof. Preferably, said organic compound is 2,2'-oxydiacetic acid (diglycolic acid).

Mention may be made, among the organic compounds comprising at least one carboxylic acid function and at least one ketone function, of glyoxylic acid, 2-oxopropanoic acid (pyruvic acid), 2-oxobutanoic acid, 3-oxopentanoic acid, 3-methyl-2-oxobutanoic acid, 4-methyl-2-oxopentanoic acid, phenylglyoxylic acid, phenylpyruvic acid, mesoxalic acid, 2-oxoglutaric acid, 2-oxohexanedioic acid, oxalosuccinic acid or the other α-keto acids of monocarboxylic acids or of polycarboxylic acids, acetylacetic acid, acetonedicarboxylic acid or the other β-keto acids of monocarboxylic acids or of polycarboxylic acids, 4-oxopentanoic acid (levulinic acid) or the other γ-keto acids of monocarboxylic acids or of polycarboxylic acids, 4-acetylbenzoic acid, dioxosuccinic acid, 4-maleylacetoacetic acid or the other polyketo acids of monocarboxylic acids or of polycarboxylic acids, in any one of the isomeric forms thereof. Preferably, said organic compound is chosen from glyoxylic acid, 2-oxopropanoic acid (pyruvic acid), 2-oxobutanoic acid, 3-methyl-2-oxobutanoic acid, phenylglyoxylic acid, phenylpyruvic acid, mesoxalic acid, 2-oxoglutaric acid, 2-oxohexanedioic acid, oxalosuccinic acid, acetylacetic acid, acetonedicarboxylic acid, 4-oxopentanoic acid (levulinic acid) or dioxosuccinic acid, according to any one of the isomeric forms thereof. More preferably still, said organic compound is chosen from glyoxylic acid, 2-oxopropanoic acid (pyruvic acid), 2-oxobutanoic acid, 3-methyl-2-oxobutanoic acid, mesoxalic acid, 2-oxoglutaric acid, acetylacetic acid, acetonedicarboxylic acid, 4-oxopentanoic acid (levulinic acid) or dioxosuccinic acid.

Mention may be made, among the organic compounds comprising at least one carboxylic acid function and at least one ester function, of acetylsalicylic acid.

Mention may be made, among the organic compounds comprising at least one carboxylic acid function, at least one hydroxyl function and at least one ether function, of 4-hydroxy-3-methoxybenzoic acid (vanillic acid), syringic acid, glucuronic acid, galacturonic acid, ferulic acid or sinapinic acid, according to any one of the isomeric forms thereof.

Preferably, said organic compound is chosen from 4-hydroxy-3-methoxybenzoic acid (vanillic acid), glucuronic acid or galacturonic acid, according to any one of the isomeric forms thereof.

Mention may be made, among the organic compounds comprising at least one carboxylic acid function, at least one hydroxyl function and at least one ketone function, of hydroxypyruvic acid, acetolactic acid, iduronic acid, ulosonic acid, meconic acid or 4-hydroxyphenylpyruvic acid, according to any one of the isomeric forms thereof. Preferably, said organic compound is chosen from hydroxypyruvic acid, acetolactic acid, iduronic acid or meconic acid, according to any one of the isomeric forms thereof.

Among all the preceding embodiments, said organic compound comprising at least one carboxylic acid function is preferably chosen from formic acid, acetic acid, propionic acid, ethanedioic acid (oxalic acid), propanedioic acid (malonic acid), butanedioic acid (succinic acid), pentanedioic acid (glutaric acid), 1,2-cyclohexanedicarboxylic acid, 1,3-cyclohexanedicarboxylic acid, (Z)-butenedioic acid (maleic acid), (E)-butenedioic acid (fumaric acid), pent-2-enedioic acid (glutaconic acid), mesaconic acid, citraconic acid, 2-methylenesuccinic acid (itaconic acid), benzene-1,2-dicarboxylic acid (phthalic acid), 1,2,3-propanetricarboxylic acid (tricarballylic acid), 1,2,4-butanetricarboxylic acid, 1,2,3-propenetricarboxylic acid (aconitic acid), 1,2,4-benzenetricarboxylic acid, 1,2,3,4-butanetetracarboxylic acid, 1,2,4,5-benzenetetracarboxylic acid, hydroxyacetic acid (glycolic acid), 2-hydroxypropanoic acid (lactic acid), 3-hydroxypropanoic acid, 3-hydroxybutyric acid, 3-hydroxyisobutyric acid, mandelic acid, 3-phenyllactic acid, tropic acid, salicylic acid, 2-hydroxypropanedioic acid (tartronic acid), 2-hydroxybutanedioic acid (malic acid), acetolactic acid, 2-hydroxypropane-1,2,3-tricarboxylic acid (citric acid), isocitric acid, homocitric acid, homoisocitric acid, glyceric acid, 2,3-dihydroxy-3-methylpentanoic acid, pantoic acid, 2,3-dihydroxybenzoic acid, β-resorcylic acid, γ-resorcylic acid, gentisic acid, orsellinic acid, dihydroxymalonic acid, 2,3-dihydroxybutanedioic acid (tartaric acid), hydroxycitric acid, trihydroxybenzoic acid, quinic acid, gluconic acid, mucic acid, saccharic acid, 2,2'-oxydiacetic acid (diglycolic acid), glyoxylic acid, 2-oxopropanoic acid (pyruvic acid), 2-oxobutanoic acid, 3-methyl-2-oxobutanoic acid, phenylglyoxylic acid, phenylpyruvic acid, mesoxalic acid, 2-oxoglutaric acid, 2-oxohexanedioic acid, oxalosuccinic acid, acetylacetic acid, acetonedicarboxylic acid, 4-oxopentanoic acid (levulinic acid), dioxosuccinic acid, acetylsalicylic acid, 4-hydroxy-3-methoxybenzoic acid (vanillic acid), glucuronic acid, galacturonic acid, hydroxypyruvic acid, acetolactic acid, iduronic acid or meconic acid, according to any one of the isomeric forms thereof.

Among all the preceding embodiments, said organic compound comprising at least one carboxylic acid function is more preferably chosen from formic acid, ethanedioic acid (oxalic acid), propanedioic acid (malonic acid), butanedioic acid (succinic acid), pentanedioic acid (glutaric acid), (Z)-butenedioic acid (maleic acid), (E)-butenedioic acid (fumaric acid), pent-2-enedioic acid (glutaconic acid), benzene-1,2-dicarboxylic acid (phthalic acid), propane-1,2,3-tricarboxylic acid (tricarballylic acid), butane-1,2,4-tricarboxylic acid, propene-1,2,3-tricarboxylic acid (aconitic acid), benzene-1,2,4-tricarboxylic acid, butane-1,2,3,4-tetracarboxylic acid, l'acide benzene-1,2,4,5-tetracarboxylic acid, hydroxyacetic acid (glycolic acid), 2-hydroxypropanoic acid (lactic acid), 3-hydroxypropanoic acid, 3-hydroxybutyric acid, 3-hydroxyisobutyric acid, 2-hydroxypropanedioic acid (tartronic acid), 2-hydroxybutanedioic acid (malic acid), acetolactic acid, 2-hydroxypropane-1,2,3-tricarboxylic acid (citric acid), glyceric acid, 2,3-dihydroxy-3-methylpentanoic acid, pantoic acid, dihydroxymalonic acid, 2,3-dihydroxybutanedioic acid (tartaric acid), quinic acid, gluconic acid, mucic acid, saccharic acid, 2,2'-oxydiacetic acid (diglycolic acid), glyoxylic acid, 2-oxopropanoic acid (pyruvic acid), 2-oxobutanoic acid, 3-methyl-2-oxobutanoic acid, mesoxalic acid, 2-oxoglutaric acid, acetylacetic acid, acetonedicarboxylic acid, 4-oxopentanoic acid (levulinic acid), dioxosuccinic acid, acetylsalicylic acid, 4-hydroxy-3-methoxybenzoic acid (vanillic acid), glucuronic acid, galacturonic acid, hydroxypyruvic acid, acetolactic acid, iduronic acid, meconic acid, according to any one of the isomeric forms thereof.

More preferably still, the organic compound comprising at least one carboxylic acid function is chosen from formic acid, ethanedioic acid (oxalic acid), propanedioic acid (malonic acid), pentanedioic acid (glutaric acid), hydroxyacetic acid (glycolic acid), 2-hydroxypropanoic acid (lactic acid), 2-hydroxypropanedioic acid (tartronic acid), 2-hydroxybutanedioic acid (malic acid), 2-hydroxypropane-1,2,3-tricarboxylic acid (citric acid), 2,3-dihydroxybutanedioic acid (tartaric acid), 2,2'-oxydiacetic acid (diglycolic acid), 2-oxopropanoic acid (pyruvic acid) or 4-oxopentanoic acid (levulinic acid).

All the embodiments relating to the nature of said organic compound can be combined together so that step ii) may be carried out by bringing said support into contact with at least one solution containing at least one organic compound comprising at least one carboxylic acid function, in particular an organic compound comprising at least one carboxylic acid function as cited above.

Implementation of Steps i) and ii)

The process for the preparation of the nickel catalyst comprises several embodiments. They differ in particular in the order of introduction of the organic compound and of the nickel precursor, it being possible for the organic compound to be brought into contact with the support either after the nickel precursor is brought into contact with the support, or before the nickel precursor is brought into contact with the support.

A first embodiment consists in carrying out said step i) prior to said step ii).

A second embodiment consists in carrying out said step ii) prior to said step i).

Each step i) and ii) of bringing the support into contact with the nickel precursor (step i) and of bringing the support into contact with at least one solution containing at least one organic compound comprising at least one carboxylic acid function (step ii) is carried out at least once and may advantageously be carried out several times, optionally in the presence of a nickel precursor and/or of an organic compound which is(are) identical or different in each step i) and/or ii) respectively, all the possible combinations for carrying out steps i) and ii) come within the scope of the invention.

According to one preferential embodiment, when said organic compound comprises at least one carboxylic acid function and at least one ketone function, step ii) is advantageously carried out before step i).

According to one preferential embodiment, when said organic compound comprises at least one carboxylic acid function and at least one hydroxyl function, step i) is advantageously carried out before step ii).

Each contacting step may preferably be followed by an intermediate drying step. The intermediate drying step is carried out at a temperature below 250° C., preferably of between 15 and 240° C., more preferably between 30 and 220° C., more preferably still between 50 and 200° C. and in an even more preferred way between 70 and 180° C. Advantageously, when an intermediate drying step is carried out, an intermediate calcining step may be carried out. The intermediate calcining step is carried out at a temperature of between 250 and 1000° C., preferably between 250 et 750° C.

Advantageously, after each contacting step, whether this is a step of bringing the nickel precursor into contact or a step of bringing the organic compound into contact, it is possible to leave the impregnated support to mature, optionally before an intermediate drying step. Maturing allows the solution to be distributed homogeneously within the support. When a maturing step is carried out, said step is advantageously carried out at atmospheric pressure or at reduced pressure, under an inert atmosphere or under an oxygen-containing atmosphere or under a water-containing atmosphere, and at a temperature of between 10° C. and 50° C. and preferably at ambient temperature. Generally, a maturing time of less than forty-eight hours and preferably of between five minutes and five hours is sufficient. Longer periods of time are not ruled out but do not necessarily contribute an improvement.

Step iii)—Drying

In accordance with the drying step iii) of the implementation for the preparation of the catalyst, prepared according to at least one mode of implementation described above, the drying step is carried out at a temperature below 250° C., advantageously between 15 and 240° C., preferably between 30 and 220° C., more preferentially still between 50 and 200° C., and even more preferentially between 70 and 180° C., for a period typically of between 10 minutes and 24 hours. Longer periods of time are not ruled out but do not necessarily contribute an improvement.

The drying stage can be carried out by any technique known to a person skilled in the art. It is advantageously carried out under an inert atmosphere or under an oxygen-containing atmosphere or under a mixture of inert gas and oxygen. It is advantageously carried out at atmospheric pressure or at reduced pressure. Preferably, this step is carried out at atmospheric pressure and in the presence of air or nitrogen.

Step iv)—Calcining (Optional)

Optionally, on conclusion of the drying step iii), a calcining step iv) is carried out at a temperature of between 250° C. and 1000° C., preferably of between 250° C. and 750° C., under an inert atmosphere or under an oxygen-containing atmosphere. The duration of this heat treatment is generally between 15 minutes and 10 hours. Longer periods of time are not ruled out but do not necessarily contribute an improvement. After this treatment, the nickel of the active phase is thus in oxide form and the catalyst contains no more or very little organic compound introduced during the synthesis thereof.

Step v)—Reducing Treatment (Optional)

Prior to the use of the catalyst in the catalytic reactor and the implementation of a hydrogenation process, at least one reducing treatment step v) is advantageously carried out in the presence of a reducing gas after steps iii) or iv), so as to obtain a catalyst comprising nickel at least partially in the metallic form.

This treatment makes it possible to activate said catalyst and to form metallic particles, in particular of nickel in the zero-valent state. Said reducing treatment may be carried out in situ or ex situ, that is to say after or before the catalyst is charged to the hydrogenation reactor. Said reducing treatment step v) may be carried out on the catalyst that has optionally been subjected to the passivation step vi), described hereinafter.

The reducing gas is preferably hydrogen. The hydrogen can be used pure or as a mixture (for example a hydrogen/nitrogen or hydrogen/argon or hydrogen/methane mixture). In the case where the hydrogen is used as a mixture, all the proportions can be envisaged.

Said reducing treatment is carried out at a temperature of between 120 and 500° C., preferably between 150 and 450° C. When the catalyst is not subjected to passivation or is subjected to a reducing treatment before passivation, the reducing treatment is carried out at a temperature of between 180 and 500° C., preferably between 200 and 450° C., and more preferentially still between 350 and 450° C. When the catalyst has been subjected beforehand to a passivation, the reducing treatment is generally carried out at a temperature of between 120 and 350° C., preferably between 150 and 350° C.

The duration of the reducing treatment is generally between 2 and 40 hours, preferably between 3 and 30 hours. The rise in temperature up to the desired reduction temperature is generally slow, for example set between 0.1 and 10° C./min, preferably between 0.3 and 7° C./min.

The hydrogen flow rate, expressed in l/hour/gram of catalyst, is between 0.01 and 100 l/hour/gram of catalyst, preferably between 0.05 and 10 l/hour/gram of catalyst and more preferably still between 0.1 and 5 l/hour/gram of catalyst.

Step vi)—Passivation (Optional)

Prior to the use thereof in the catalytic reactor, the catalyst according to the invention may optionally be subjected to a step of passivation (step vi) by a sulfur or oxygen compound or by $CO_2$, before or after the reducing treatment step v). This passivation step may be carried out ex situ or in situ. The passivation step is carried out by the use of methods known to a person skilled in the art.

The step of passivation by sulfur makes it possible to improve the selectivity of the catalysts and to prevent thermal runaways during the start-ups of fresh catalysts. The passivation generally consists in irreversibly poisoning, by the sulfur compound, the most virulent active sites of the nickel which exist on the fresh catalyst and thus in weakening the activity of the catalyst in favor of its selectivity. The passivation step is carried out by the use of methods known to a person skilled in the art and in particular, by way of example, by the use of one of the methods described in the patent documents EP 0 466 567, U.S. Pat. No. 5,153,163, FR 2 676 184, WO2004/098774 and EP 0 707 890. The sulfur compound is, for example, chosen from the following compounds: thiophene, thiophane, alkyl monosulfides, such as dimethyl sulfide, diethyl sulfide, dipropyl sulfide and propyl methyl sulfide, or else an organic disulfide of formula HO—$R_1$—S—S—$R_2$—OH, such as dithiodiethanol of formula HO—$C_2H_4$—S—S—$C_2H_4$—OH (often known as DEODS). The sulfur content is generally between 0.1% and 2% by weight of said element, with respect to the weight of the catalyst.

The step of passivation by an oxygen compound or by $CO_2$ is generally carried out after a reducing treatment beforehand at high temperature, generally of between 350 and 500° C., and makes it possible to preserve the metallic phase of the catalyst in the presence of air. A second reducing treatment at lower temperature, generally between 120 and 350° C., is subsequently generally carried out. The oxygen compound is generally air or any other oxygen-containing stream.

The catalyst prepared according to at least any one of the embodiments described above, optionally in combination with said step iv) and/or said step v) and/or said step vi) is, before the implementation of the selective hydrogenation process according to the invention, either completely or at least partially stripped of said organic compound comprising at least one carboxylic acid function. The introduction of the organic compound during the preparation thereof has made it possible to increase the dispersion of the active phase thus leading to a more active and/or more selective catalyst.

The invention is illustrated by the examples which follow.

EXAMPLES

All of the catalysts prepared in examples 1 to 10 are prepared with the same content of element nickel. The support used for the preparation of each of these catalysts is a δ-alumina having a pore volume of 0.67 ml/g and a BET surface area equal to 70 m$^2$/g.

Example 1: Preparation of the Aqueous Solutions of Ni Precursors

A first aqueous solution of Ni precursors (solution S1) used for the preparation of the catalysts A, B, D, E, F and I is prepared at 25° C. by dissolving 276 g of nickel nitrate Ni(NO$_3$)$_2$.6H$_2$O (supplied by Strem Chemicals®) in a volume of 100 ml of demineralized water. The solution S1, the NiO concentration of which is 19.0% by weight (relative to the mass of the solution), is obtained.

A second aqueous solution of Ni precursors (solution S2) used for the preparation of the catalysts C, G and H is prepared at 25° C. by dissolving 151 g of nickel nitrate Ni(NO$_3$)$_2$.6H$_2$O (supplied by Strem Chemicals®) in a volume of 50 ml of demineralized water. The solution S2, the NiO concentration of which is 19.3% by weight (relative to the mass of the solution), is obtained.

Example 2 (Comparative): Preparation of a Catalyst a by Impregnation of Nickel Nitrate without Additive The solution S1 prepared in example 1 is dry-impregnated on 10 g of said alumina support. The solid thus obtained is subsequently dried in an oven overnight at 120° C., and then calcined under a stream of air of 1 l/h/g of catalyst at 450° C. for 2 hours.

The calcined catalyst A thus prepared contains 13.8% by weight of the element nickel supported on alumina and it has nickel oxide crystallites, the mean diameter of which (determined by X-ray diffraction from the width of the diffraction line located at the angle 2θ=43°) is 19.1 nm.

Example 3 (Invention): Preparation of a Catalyst B by Successive Impregnation of Nickel Nitrate then of Propanedioic Acid (Malonic Acid)

The catalyst B is prepared by impregnation of Ni nitrate on said alumina support, then by impregnation of malonic acid using a {malonic acid/nickel} molar ratio equal to 0.6.

In order to do this, the solution S1 prepared in example 1 is dry-impregnated on said alumina support. The solid B1 thus obtained is then dried in an oven overnight at 120° C. Next, an aqueous solution B' is prepared by dissolving 4.81 g of malonic acid (CAS 141-82-2, supplied by Alfa Aesar, 99% purity) in 20 ml of demineralized water. This solution B' is then dry-impregnated on 10 g of the previously prepared solid B1. The solid thus obtained is subsequently dried in an oven overnight at 120° C., and then calcined under a stream of air of 1 l/h/g of catalyst at 450° C. for 2 hours.

The calcined catalyst B thus prepared contains 13.8% by weight of the element nickel supported on alumina and it has nickel oxide crystallites, the mean diameter of which is 3.8 nm.

Example 4 (Invention): Preparation of a Catalyst C by Successive Impregnation of Propanedioic Acid (Malonic Acid) then of Nickel Nitrate The catalyst C is prepared by impregnation of malonic acid on said alumina support, then by impregnation of Ni nitrate using a {malonic acid/nickel} molar ratio equal to 0.6.

In order to do this, an aqueous solution C' is prepared by dissolving 4.81 g of malonic acid (CAS 141-82-2, supplied by Alfa Aesar, 99% purity) in 20 ml of demineralized water. This solution C' is then dry-impregnated on said alumina support. The solid C1 thus obtained is subsequently dried in an oven overnight at 120° C. Next, the solution S2 prepared in example 1 is dry-impregnated on 10 g of the previously prepared solid C1. The solid thus obtained is subsequently dried in an oven overnight at 120° C., and then calcined under a stream of air of 1 l/h/g of catalyst at 450° C. for 2 hours.

The calcined catalyst C thus prepared contains 13.8% by weight of the element nickel supported on alumina and it has nickel oxide crystallites, the mean diameter of which is 4.5 nm.

Example 5 (Invention): Preparation of a Catalyst D by Successive Impregnation of Nickel Nitrate then of 2-Hydroxypropanoic Acid (Lactic Acid)

The catalyst D is prepared by impregnation of Ni nitrate on said alumina support, then by impregnation of lactic acid using a {lactic acid/nickel} molar ratio equal to 0.6.

In order to do this, the solution S1 prepared in example 1 is dry-impregnated on said alumina support. The solid D1 thus obtained is then dried in an oven overnight at 120° C. Next, an aqueous solution D' is prepared by dissolving 4.19 g of lactic acid (CAS 15-21-5, supplied by Fluka) in 20 ml of demineralized water. This solution D' is then dry-impregnated on 10 g of the previously prepared solid D1. The solid thus obtained is subsequently dried in an oven overnight at 120° C., and then calcined under a stream of air of 1 l/h/g of catalyst at 450° C. for 2 hours.

The calcined catalyst D thus prepared contains 13.8% by weight of the element nickel supported on alumina and it has nickel oxide crystallites, the mean diameter of which is 5.1 nm.

Example 6 (Invention): Preparation of a Catalyst E by Successive Impregnation of Nickel Nitrate then of 2-Hydroxypropanoic Acid (Lactic Acid), with an Additive-to-Nickel Molar Ratio of 0.3

The catalyst E is prepared by impregnation of Ni nitrate on said alumina support, then by impregnation of lactic acid using a {lactic acid/nickel} molar ratio equal to 0.3.

In order to do this, the solution S1 prepared in example 1 is dry-impregnated on said alumina support. The solid E1 thus obtained is then dried in an oven overnight at 120° C. Next, an aqueous solution E' is prepared by dissolving 2.1 g of lactic acid (CAS 15-21-5, supplied by Fluka) in 20 ml of demineralized water. This solution E' is then dry-impregnated on 10 g of the previously prepared solid E1. The solid thus obtained is subsequently dried in an oven overnight at 120° C., and then calcined under a stream of air of 1 l/h/g of catalyst at 450° C. for 2 hours.

The calcined catalyst E thus prepared contains 13.8% by weight of the element nickel supported on alumina and it has nickel oxide crystallites, the mean diameter of which is 6.0 nm.

Example 7 (Invention): Preparation of a Catalyst F by Successive Impregnation of Nickel Nitrate then of 2-Hydroxypropanoic Acid (Lactic Acid), with an Additive-to-Nickel Molar Ratio of 1.2

The catalyst F is prepared by impregnation of Ni nitrate on said alumina support, then by impregnation of lactic acid using a {lactic acid/nickel} molar ratio equal to 1.2.

In order to do this, the solution S1 prepared in example 1 is dry-impregnated on said alumina support. The solid F1 thus obtained is then dried in an oven overnight at 120° C. Next, an aqueous solution F' is prepared by dissolving 8.39 g of lactic acid (CAS 15-21-5, supplied by Fluka) in 20 ml of demineralized water. This solution F' is then dry-impregnated on 10 g of the previously prepared solid F1. The solid thus obtained is subsequently dried in an oven overnight at 120° C., and then calcined under a stream of air of 1 l/h/g of catalyst at 450° C. for 2 hours.

The calcined catalyst F thus prepared contains 13.8% by weight of the element nickel supported on alumina and it has nickel oxide crystallites, the mean diameter of which is 4.8 nm.

Example 8 (Invention): Preparation of a Catalyst G by Successive Impregnation of 2-Oxopropanoic Acid (Pyruvic Acid) then of Nickel Nitrate The catalyst G is prepared by impregnation of pyruvic acid on said alumina support then by impregnation of Ni nitrate using a {pyruvic acid/nickel} molar ratio equal to 0.6.

In order to do this, an aqueous solution G' is prepared by dissolving 4.07 g of pyruvic acid (CAS 127-17-3, supplied by Sigma Aldrich, 98% purity) in 20 ml of demineralized water. This solution G' is then dry-impregnated on said alumina support. The solid G1 thus obtained is subsequently dried in an oven overnight at 120° C. Next, the solution S2 prepared in example 1 is dry-impregnated on 10 g of the previously prepared solid G1. The solid thus obtained is subsequently dried in an oven overnight at 120° C., and then calcined under a stream of air of 1 l/h/g of catalyst at 450° C. for 2 hours.

The calcined catalyst G thus prepared contains 13.8% by weight of the element nickel supported on alumina and it has nickel oxide crystallites, the mean diameter of which is 6.2 nm.

Example 9 (Invention): Preparation of a Catalyst H by Successive Impregnation of 2-Oxopropanoic Acid (Pyruvic Acid) then of Nickel Nitrate, without Final Calcining The catalyst H is prepared by impregnation of pyruvic acid on said alumina support then by impregnation of Ni nitrate using a {pyruvic acid/nickel} molar ratio equal to 0.6.

In order to do this, an aqueous solution H' is prepared by dissolving 4.07 g of pyruvic acid (CAS 127-17-3, supplied by Sigma Aldrich, 98% purity) in 20 ml of demineralized water. This solution H' is then dry-impregnated on said alumina support. The solid H1 thus obtained is subsequently dried in an oven overnight at 120° C. Next, the solution prepared in example 1 is dry-impregnated on 10 g of the previously prepared solid H1. The solid thus obtained is subsequently dried in an oven overnight at 120° C., without any heat treatment. The catalyst H is obtained.

In order to carry out the characterizations, a portion of this catalyst H is calcined under a stream of air of 1 l/h/g of catalyst at 450° C. for 2 hours, in order to obtain the calcined catalyst H_calci. The calcined catalyst H_calci contains 13.8% by weight of the element nickel supported on alumina and it has nickel oxide crystallites, the mean diameter of which is 5.9 nm.

Example 10 (Invention): Preparation of a Catalyst I by Successive Impregnation of Nickel Nitrate then of 2,2'-Oxobis(Ethanoic Acid) (Diglycolic Acid)

The catalyst I is prepared by impregnation of Ni nitrate on said alumina support, then by impregnation of diglycolic acid using a {diglycolic acid/nickel} molar ratio equal to 0.6.

In order to do this, the solution S1 prepared in example 1 is dry-impregnated on said alumina support. The solid I1 thus obtained is then dried in an oven overnight at 120° C. Next, an aqueous solution I' is prepared by dissolving 6.20 g of diglycolic acid (CAS 110-99-6, supplied by Alfa Aesar, 98% purity) in 20 ml of demineralized water. This solution I' is then dry-impregnated on 10 g of the previously prepared solid I1. The solid thus obtained is subsequently dried in an oven overnight at 120° C., and then calcined under a stream of air of 1 l/h/g of catalyst at 450° C. for 2 hours.

The calcined catalyst I thus prepared contains 13.8% by weight of the element nickel supported on alumina and it has nickel oxide crystallites, the mean diameter of which is 4.8 nm.

Example 11 (Invention): Evaluation of the Catalytic Properties of the Catalysts A to I in the Selective Hydrogenation of a Mixture Containing Styrene and Isoprene The catalysts A to I described in the above examples are also tested with regard to the reaction for the selective hydrogenation of a mixture containing styrene and isoprene.

The composition of the feedstock to be selectively hydrogenated is the following: 8% by weight of styrene (supplied by Sigma Aldrich®, 99% purity), 8% by weight of isoprene (supplied by Sigma Aldrich®, 99% purity), 84% by weight of n-heptane (solvent) (supplied by VWR®, purity >99% Chromanorm HPLC). This feedstock also contains sulfur compounds at a very low content: 10 ppm by weight of sulfur introduced in the form of pentanethiol (supplied by Fluka®, purity >97%) and 100 ppm by weight of sulfur introduced in the form of thiophene (supplied by Merck®, purity 99%). This composition corresponds to the initial composition of the reaction mixture. This mixture of model molecules is representative of a pyrolysis gasoline.

The selective hydrogenation reaction is carried out in a 500 ml stainless steel autoclave which is provided with a magnetically-driven mechanical stirrer and which is able to operate under a maximum pressure of 100 bar (10 MPa) and temperatures of between 5° C. and 200° C.

Prior to its introduction into the autoclave, an amount of 3 ml of catalyst is reduced ex situ under a stream of hydrogen of 1 l/h/g of catalyst at 400° C. for 16 hours (temperature rise gradient of 1° C./min) and then it is transferred into the autoclave, with the exclusion of air. After addition of 214 ml of n-heptane (supplied by VWR®, purity >99% Chromanorm HPLC), the autoclave is closed, purged, then pressurized under 35 bar (3.5 MPa) of hydrogen and brought to the temperature of the test, which is equal to 30° C. At the time t=0, approximately 30 g of a mixture containing styrene, isoprene, n-heptane, pentanethiol and thiophene are introduced into the autoclave. The reaction mixture then has the composition described above and stirring is started at 1600 rev/min. The pressure is kept constant at 35 bar (3.5 MPa) in the autoclave using a storage cylinder located upstream of the reactor.

The progress of the reaction is monitored by taking samples from the reaction medium at regular time intervals: the styrene is hydrogenated to give ethylbenzene, without hydrogenation of the aromatic ring, and the isoprene is hydrogenated to give methylbutenes.

If the reaction is prolonged for longer than necessary, the methylbutenes are in their turn hydrogenated to give isopentane. The hydrogen consumption is also monitored over time by the decrease in pressure in a storage cylinder located upstream of the reactor. The catalytic activity is expressed in moles of $H_2$ consumed per minute and per gram of Ni.

The catalytic activities measured for the catalysts A to I are given in table 1 below. They are with reference to the catalytic activity measured for the catalyst A ($A_{HYD1}$).

TABLE 1

Comparison of the selective hydrogenation performance of a mixture containing styrene and isoprene.

| Catalyst | Additive used | Method of introducing the additive | Mean size of the NiO crystallites (nm) | $A_{HYD1}$ (%) |
|---|---|---|---|---|
| A (not in accordance) | — | — | 19.1 | 100 |
| B (in accordance) | Malonic acid | Steps i) then ii) | 3.8 | 457 |
| C (in accordance) | Malonic acid | Steps ii) then i) | 4.5 | 386 |
| D (in accordance) | Lactic acid | Steps i) then ii) | 5.1 | 363 |
| E (in accordance) | Lactic acid | Steps i) then ii) - additive/Ni molar ratio = 0.3 | 6.0 | 319 |
| F (in accordance) | Lactic acid | Steps i) then ii) - additive/Ni molar ratio = 1.2 | 4.8 | 384 |
| G (in accordance) | Pyruvic acid | Steps ii) then i) | 6.2 | 308 |
| H (in accordance) | Pyruvic acid | Steps ii) then i) - without calcining | 5.9 | 327 |
| I (in accordance) | Diglycolic acid | Steps i) then ii) | 4.8 | 376 |

The results that appear in table 1 demonstrate that the catalysts B to I, prepared in the presence of an organic compound (having at least one carboxylic acid function), are more active than the catalyst A prepared in the absence of this type of organic compound. This effect is related to the decrease in the size of the Ni particles.

The invention claimed is:

1. A process comprising selective hydrogenation of polyunsaturated compounds containing at least 2 carbon atoms per molecule, contained in a hydrocarbon feedstock having a final boiling point below or equal to 300° C., which process being carried out at a temperature of 0 to 300° C., at a pressure of 0.1 to 10 MPa, at a hydrogen/(polyunsaturated compounds to be hydrogenated) molar ratio of 0.1 to 10 and at an hourly space velocity of 0.1 to 200 $h^{-1}$ when the process is carried out in the liquid phase, or at a hydrogen/(polyunsaturated compounds to be hydrogenated) molar ratio of 0.5 to 1000 and at an hourly space velocity of 100 to 40 000 $h^{-1}$ when the process is carried out in the gas phase, in the presence of a catalyst comprising an alumina support and an active phase comprising nickel, said active phase not comprising a metal from Group VIB, said catalyst being prepared by a process comprising at least:
   i) contacting said support with at least one solution containing at least one nickel precursor,
   ii) contacting said support with at least one solution containing at least one organic compound having 1 to 10 carbon atoms and at least one carboxylic acid function;
   iii) drying said impregnated support at a temperature below 250° C.;
   iv) optionally calcining dried, impregnated support of iii);
   i) and ii) being carried out separately, in any order and prior to iv).

2. The process as claimed in claim 1, further comprising at least one calcination iv) of said catalyst obtained in iii) at a temperature of 250 to 1000° C.

3. The process as claimed in claim 1, wherein i) is carried out before ii).

4. The process as claimed in claim 1, wherein ii) is carried out before i).

5. The process as claimed in claim 1, wherein i) and/or ii) is (are) carried out by dry impregnation.

6. The process as claimed in claim 1, wherein the content of the element nickel is 1 to 35% by weight relative to the total weight of the catalyst.

7. The process as claimed in claim 1, wherein said organic compound is a monocarboxylic acid, a dicarboxylic acid, a tricarboxylic acid or a tetracarboxylic acid.

8. The process as claimed in claim 1, wherein said organic compound comprising at least one carboxylic acid function further comprises at least one second ether, hydroxyl, ketone, or ester functional group.

9. The process as claimed in claim 8, wherein when said organic compound comprises at least one carboxylic acid function and at least one ketone function, ii) is carried out before i).

10. The process as claimed in claim 8, wherein when said organic compound comprises at least one carboxylic acid function and at least one hydroxyl function, i) is carried out before ii).

11. The process as claimed in claim 8, wherein said organic compound comprises at least three different functional groups that are at least one carboxylic acid function, at least one hydroxyl function at least one ether function or one ketone function.

12. The process as claimed in claim 1, wherein the molar ratio between said organic compound and the nickel is 0.01 to 5.

13. The process as claimed in claim 1, wherein the feedstock is a steam cracking C2 cut or a steam cracking C2-C3 cut, and wherein in the process the hydrogen/(polyunsaturated compounds to be hydrogenated) molar ratio is 0.5 to 1000, the temperature is 0 to 300° C., the hourly space velocity (HSV) is 100 to 40 000 $h^{-1}$, and the pressure is 0.1 to 6.0 MPa.

14. The process as claimed in claim 1, wherein the feedstock is a steam cracking gasoline and in which process the hydrogen/(polyunsaturated compounds to be hydrogenated) molar ratio is 0.5 to 10, the temperature is 0 to 200° C., the hourly space velocity (HSV) is 0.5 to 100 $h^{-1}$, and the pressure is 0.3 to 8.0 MPa.

15. The process as claimed in claim 1, wherein the polyunsaturated compounds containing at least 2 carbon atoms per molecule are as diolefins and/or acetylenic compounds and/or alkenylaromatic compounds.

16. The process as claimed in claim 1, wherein the organic compound having 1 to 10 carbon atoms is formic acid, acetic acid, propionic acid, butanoic acid, valeric acid, hexanoic acid, heptanoic acid, octanoic acid or nonanoic acid.

17. The process as claimed in claim 1, wherein the organic compound having 1 to 10 carbon atoms is formic acid, acetic acid or propionic acid.

18. The process as claimed in claim 1, wherein the organic compound having 1 to 10 carbon atoms is formic acid.

19. The process as claimed in claim 1, wherein the organic compound having 1 to 10 carbon atoms is isobutyric acid, pivalic acid, 4-methyloctanoic acid, 3-methylvaleric acid, 4-methylvaleric acid, 2-methylvaleric acid, isovaleric acid, 2-ethylhexanoic acid, 2-methylbutyric acid, 2-ethylbutyric acid, 2-propylvalerianic acid or valproic acid, in any one of the isomeric forms thereof, or cyclopentanecarboxylic acid or cyclohexanecarboxylic acid.

* * * * *